(12) United States Patent
Kosmas

(10) Patent No.: US 12,286,246 B2
(45) Date of Patent: Apr. 29, 2025

(54) TWO PHASE LANDING SYSTEM FOR THE MOON AND ITS IMPLEMENTATION ELEMENTS

(71) Applicant: Charalampos Kosmas, Ilioupolis (GR)

(72) Inventor: Charalampos Kosmas, Ilioupolis (GR)

( * ) Notice: Subject to any disclaimer, the term of this patent is extended or adjusted under 35 U.S.C. 154(b) by 0 days.

(21) Appl. No.: 18/283,980

(22) PCT Filed: Mar. 25, 2022

(86) PCT No.: PCT/EP2022/057971
§ 371 (c)(1),
(2) Date: Sep. 25, 2023

(87) PCT Pub. No.: WO2022/200596
PCT Pub. Date: Sep. 29, 2022

(65) Prior Publication Data
US 2024/0166378 A1    May 23, 2024

(30) Foreign Application Priority Data
Mar. 25, 2021   (EP) ..................................... 21165077

(51) Int. Cl.
*B64G 1/10*    (2006.01)
*B64G 1/62*    (2006.01)
*B64G 1/64*    (2006.01)

(52) U.S. Cl.
CPC ........... *B64G 1/625* (2023.08); *B64G 1/1071* (2023.08); *B64G 1/648* (2013.01)

(58) Field of Classification Search
CPC . B64G 1/62; B64G 1/64; B64G 1/625; B64G 1/648; B64G 1/1071
USPC ................................ 244/158.1, 158.2, 173.3
See application file for complete search history.

(56) References Cited

U.S. PATENT DOCUMENTS

| | | | |
|---|---|---|---|
| 6,565,044 B1 * | 5/2003 | Johnson ................. | B64G 1/648 244/171.5 |
| 2008/0099624 A1 * | 5/2008 | Evjenth .................. | B64G 1/648 244/158.2 |
| 2010/0127890 A1 * | 5/2010 | Spinelli .................. | B62D 57/00 180/7.1 |

FOREIGN PATENT DOCUMENTS

| CN | 106347716 A | * | 1/2017 | ............. B64G 1/646 |
|---|---|---|---|---|
| WO | WO-2019135786 A1 | * | 7/2019 | |

* cited by examiner

*Primary Examiner* — Joshua E Rodden
(74) *Attorney, Agent, or Firm* — Weitzman Law Offices, LLC

(57) ABSTRACT

An innovative landing system for a spacecraft according to the invention includes a foldable tether-based carrier structure that when unfolded assumes wheel-type shape and in its centre supports a carrier platform for the payload of the spacecraft.

7 Claims, 8 Drawing Sheets

Fig. 4a
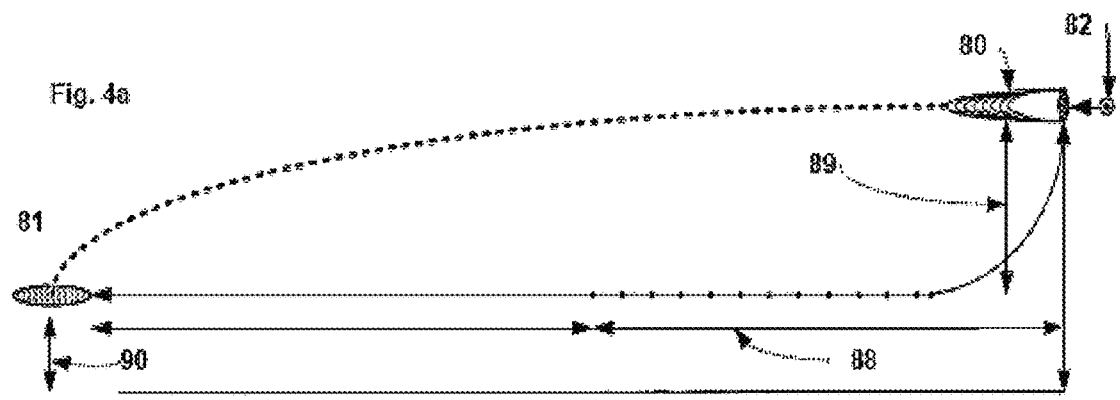
Fig. 4b
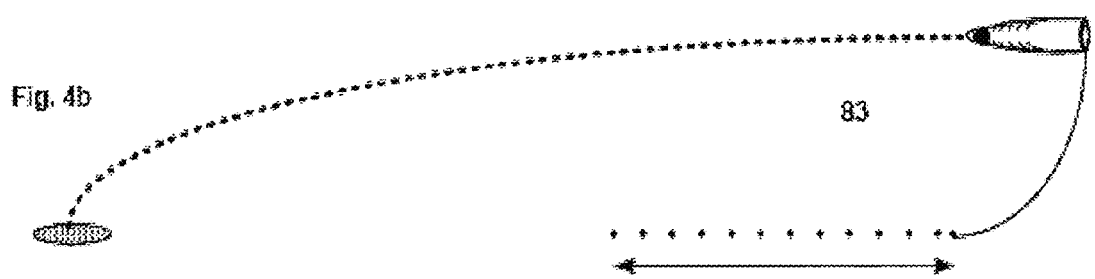
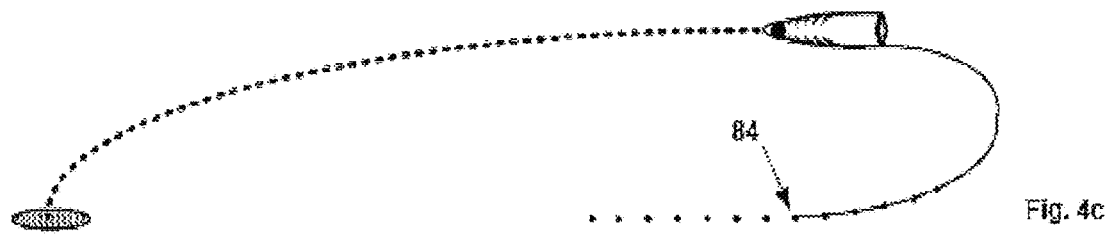
Fig. 4c
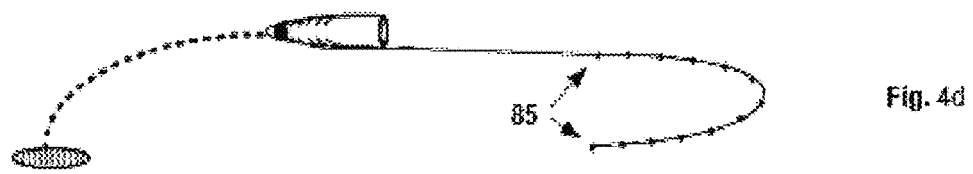
Fig. 4d
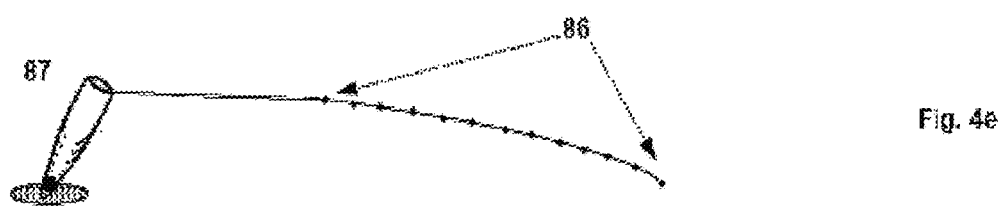
Fig. 4e

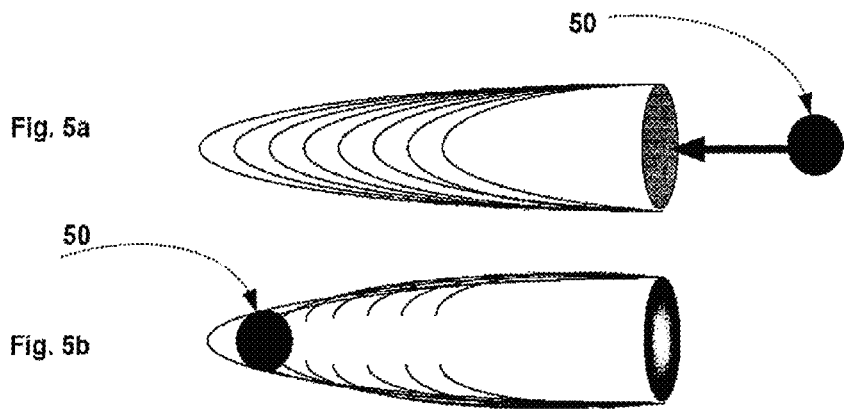
Fig. 5a
Fig. 5b
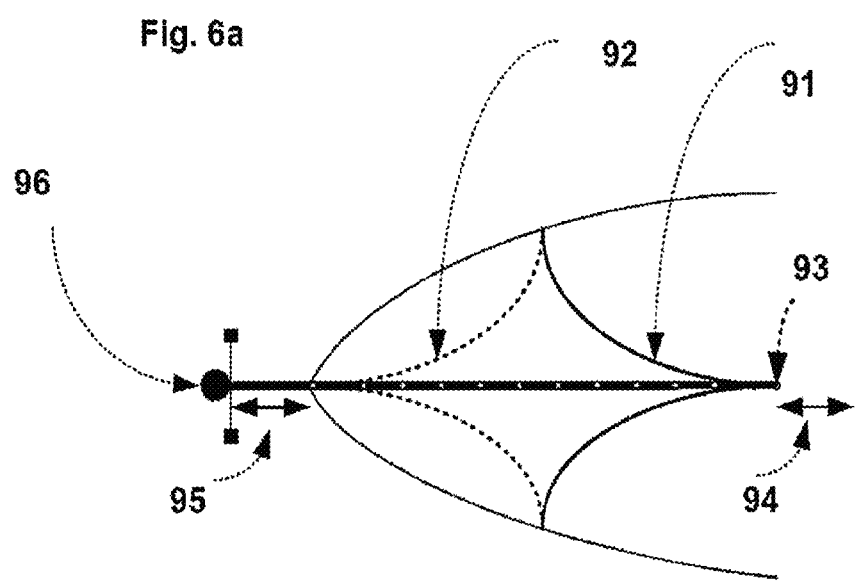
Fig. 6a
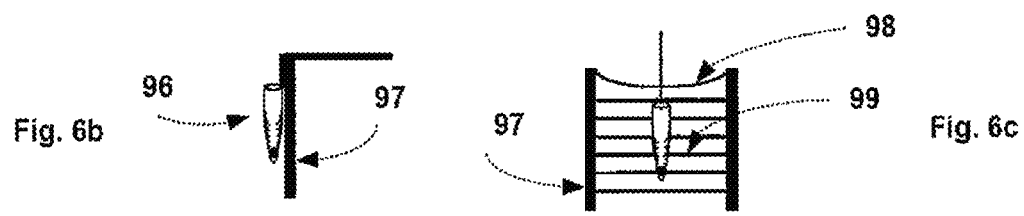
Fig. 6b
Fig. 6c

TWO PHASE LANDING SYSTEM FOR THE MOON AND ITS IMPLEMENTATION ELEMENTS

FIELD OF INVENTION

The invention relates to a two stage cargo delivering system to the surface of a celestial object, in particular the Moon surface or the surface of a planet.

BACKGROUND

Spacecrafts that perform "soft landing" on the surface of the Moon burn large amounts of fuel, in order to decelerate from a low lunar orbit (LLO) of 1626 m/sec, down to zero speed. The propulsion subsystem of such spacecraft together with their fuel can reach up to 70% of the overall mass of the spacecraft. This is why in both cases, in the Apollo mission and in the recent sample return mission of China (Chang'e 5) a two-spacecraft system was employed (a lander carrying an ascend vehicle). After completing the mission on the surface, only one module, the ascend vehicle, was lifted for returning to Low Lunar Orbit (LLO) while the empty hardware of the landing vehicle was left at the landing spot, practically useless. This is a significant loss of material and resources, and of low efficiency (30%).

SUMMARY OF INVENTION

It is therefore an objective of the invention to provide a landing system for an object in space, in particular a planet or preferably the moon, which allows for smooth landing maneuvers with high efficiency and a low loss of materials or resources.

According to the present invention, this is achieved by a landing system with a foldable tether-based carrier structure, that when unfolded assumes a wheel-type shape and in its centre supports a carrier platform for the payload.

The invention is based upon the consideration that an advanced landing system for a spacecraft could exploit two distinctive features of the Lunar surface, i.e the flat mare, then, by scavenging material from that establish another parcel-catching system ideally placed at the high rims of the craters. This may be used for a landing concept in which landing and especially touchdown is effected by a more or less tangential approach of the spacecraft towards the surface. In the first phase of landing, a wheel shaped spacecraft, specially designed for roll friction landing (RFL) on the flat mare, is used to land large volume payloads (Oversized Payload Lander On Non-Atmospheric Somata (OPLO-NAS)). During a second phase, materials from the flexible parts (the axial, perimetric sole holding tethers, as well as the flexible perimetric sole) of the first spacecraft are scavenged for implementing a wire/rope based, small parcel catcher (Momentum Absorption Catcher for Express Delivery On Non-Atmospheric Somata (MACEDONAS)).

The system, according to the invention, intends to make large parts of the spacecraft a commodity, useful at the early stages of Lunar exploitation activities. The equivalent of burned fuel volatiles is the wire/rope based structure proposed as flexible elements of the OPLONAS. Instead of consuming fuel, the flexible perimeteric sole effects the breaking by means of roll friction.

Considering that certain areas of the Moon surface have rather flat surfaces, called "Mare" as large as of 1146 Km diameter (Mare Imbrium), or large flat craters like crater "Sinus Iridum" (of 240 Km diameter) a roll friction based spacecraft can land tangentially to the surface and roll till all its kinetic energy dissipates from roll friction. Such spacecraft needs to decelerate from the very high speed of 1626 m/sec to nil covering a distance at a maximum of 1146 Km. Such a momentum/speed dumping can be achieved for a constant deceleration of 1.153 m/sec2 in a course of about 10 minutes.

In accordance with a preferred embodiment of the invention, the landing system OPLONAS is composed of a number of tethers emanating, in particular radially, from a centrally located cylindrical, payload carrying, platform. These tethers may be assembled such that when spanned up they form the shape of a large (60 meter diameter) wheel in the centre of which said cylindrical payload carrying platform may be positioned. The wheel shape should be rotatable around or together with said platform such that the desired wheel shape is obtained as a result of centrifugal forces when the system of tethers rotates around or with the platform. In this concept, even if the tethers when in static state due to their limb structure may be collapsed or folded and therefore require only little room, due to sufficiently fast rotation of the tether system around or with the platform, centrifugal force creates sufficient tension along the tethers to keep them spanned and the wheel type structure takes shape.

In this concept, rotational speed of the system may be chosen high enough such that circumferential speed of the structure of tethers at its outer rim approximates or even matches the speed over the ground the spacecraft will have, when approaching the Lunar surface to land. In consequence the system may be sufficiently synchronized, that the differential speed between outer circumference of the wheel type structure and the lunar surface is low, maybe even zero, allowing for a smooth touchdown. After touchdown, the wheel type structure will continue rolling on the lunar surface, thereby more and more dissipating energy and therefore slowing down.

In other words, the system OPLONAS according to this aspect of the invention is designed to take advantage of the physical phenomenon of roll friction to dissipate the kinetic energy of a payload which is carried within the OPLONAS. Further, in a preferred embodiment the whole of the system including the tether based shielding is part of the overall spacecraft, and together with the rigid cylindrical core, (the flexible part of the overall OPLONAS spacecraft) will eventually rest together with the rigid cylindrical core, and it will be subject to later scavenging, a positive characteristic with respect to Moon base development needing structural material.

In an aspect of the invention, the landing system (OPLO-NAS) in addition to the components already mentioned (central payload platform, first type of tethers emanating from this platform), further comprises a second type of tethers which, in fully expanded state of the tether wheel, form the outer circumference of the wheel, thereby—comparable to the wheels of a bicycle—providing the actual outer, circumferential surface the tether wheel rolls on after touchdown. In view of the expected high stress these tethers of second type are exposed to after touchdown, in a preferable embodiment they are made of so called "gum-metal", an alloy of the type Ti-23Nb-0.7Ta-2Zr-1.20. This gum-metal preferably is used for the perimetric sole because it has better properties as regards abrasion, recycling and reuse. Its wires and ropes can enable the construction of the parcel landing system (MACEDONAS). Another argument for the choice of gum-metal alloy for the perimeter is the low friction coefficient. Gum metal is also suitable for momentum dumping through internal friction in multithreaded core configurations.

The landing concept of the invention in particular exploits the fact that the large rotational speed required to eliminate displacement friction (8.62 r/sec) along the vector of motion generates centrifuge forces that can keep the cylindrical core payload carrying platform at a safe distance from the terrain for as long as the terrain has minor obstacles (less than the length (27 meters) of the supporting tethers). It is obvious that the system would benefit from scaling up dimensions and the preferred embodiment presented is merely sized to fit on a single launch mission of currently available launch vehicles. In the future, when spacecraft may be assembled on orbit, spacecraft of much greater sizes will become possible.

With respect to the degree of deceleration that can be achieved from roll friction four eras as regards the deployment timeline should be considered. Early era A where the terrain is natural, with its obstacles and craters, a later era B where the disturbing obstacles and craters could be eliminated by means of ground levelling works. Then, soil sieving could be effected (in a further later era) C in order to increase the roll friction if deemed beneficial. A further D era could be enabled by shaping dunes and hills of pulverised regolith which can stop an incoming payload even on a direct hit. It needs to be observed that the pulverised regolith, which may have been baked out to give-up volatiles, will have very little density because of three reasons A. the low gravity, which works against compactness, high adhesion due to the highly irregular shape of the pulverized regolith, due to the fact that such dust has not been worn out by geological process, like on earth which may turn very irregular initially pieces of material into pebbles.

Microscopically the lunar regolith remains very irregular and so mechanically engaging and adhesive. Steep hills, or walls, or canyons of piled-up pulverized regolith may be created (engineered). As noted above large amounts of naturally pulverised regolith may become available as a by-product of a volatiles extraction industrial scale process.

Currently, the terrain relief (/elevation model) of the Lunar surface is known with a precision of 9 cm by the maps generated by LRO (Lunar Reconnaissance Orbiter). This elevation model can be utilized to chart landing strips free from obviously insurmountable risks. The natural terrain has on its top layer of soil significant amount of pulverized rock that is called regolith (from the Greek words regos=carpet/cover and lithos=stone). This pulverized rock, (in the form of clay, slit, sand or gravel), is the cover that will act beneficially as protection of the wire/rope based tethers of the perimeter of the OPLONAS, against potentially sharp rocks and the interaction of the wire/rope tether based perimeter with the pulverized rock/sand will act as a damping mechanism. One needs to recall how difficult it is to walk on a sandy beach with respect to walking on a smooth pavement, or even more when carrying a piece of luggage in these two circumstances.

In any case, the spacecraft core, having propulsion capabilities for reaching the landing spot, could further function (also with the flexible wire based tethers deployed) provided that fuel is still available. It can so use some fuel for compensating against insufficient roll friction, would the case be for some terrains (in early eras (see above) in particular).

With respect to the timeline of landing the following sequence of events can be contemplated.

Alignment of spacecraft's orbit to the desired landing corridor. Spacecraft is placed at the lowest possible circular orbit. Alignment of spin axis of the spacecraft perpendicular to the plane that connects the middle line of the landing corridor to the spacecraft orbit. Use of spinup thrusters to spin up the spacecraft and at the same time reduce further altitude. Final firing of thrusters at appropriate timing to reduce further altitude and achieve contact with the lunar surface. Some bouncing may be experienced in reaction to not completely parallel motion of the spacecraft to the ground.

In a preferred embodiment, the mass margin for the perimetric shield (sole) is allocated in accordance with the following considerations and calculation:

The perimetric cylindrical shield, (or sole) of the wheel-looking spacecraft in the following is defined as the cylindrical perimeter (diameter 60 m, height 9 m) that will roll on the lunar soil. It will be suspended from the cylindrical core spacecraft (upon deployment) by means of high strength ropes. The question whether exists such material capable of carrying the loads that will develop upon the rotation by 8.62 rounds/sec requires some calculations to be answered.

Considering according to the preferred embodiment that the perimetric cylindrical shield will have to reach a linear velocity of 1626 m/sec we can use the following table to compare material.

TABLE 1

| Maximum linear velocity m/sec *0.98 (1) | Candidate material name (2) | Strength GPa (3) | Length m (4) | Density gr/cm3 (5) | own Material mass of rope In kg for 30 m (6) | kg mass can carry a rope cros-section 1 cm2 (7) | margin (8) |
|---|---|---|---|---|---|---|---|
| 1593.48 | Aramid ® | 2.7 | 30 | 1.44 | 4.32 | 3.19 | −1.13 |
| 1593.48 | Zylon ® | 5.8 | 30 | 1.56 | 4.68 | 6.85 | 2.17 |

In column (1) the linear velocity of 1,626 m/sec is multiplied with 0.98 to account for the elongation that the material will encounter. Therefore, the design should be based in a way to account for this. In accordance with a preferred embodiment of the invention this correction is effected on the linear speed. Column (2) identifies the commercial names of candidate rope materials. Column (3) states the tensile strength of the material and in particular the Ultimate tensile strengths are recited. Column (4), in turn, indicates the chosen length for the radius of the perimetric cylindrical shield. For simplification this value is used as if the ropes would emanate from the centre of the cylindrical core spacecraft, although the cylindrical core spacecraft would have 3 meters radius and therefore the mass that should be accounted for the ropes would be actually less that what is depicted at the table (by 618 kgr or 10%) (0.156 kgr/meter for a density 1.56 g/cm3).

Column (5) identifies the density of the materials under investigation. Column (6) gives the calculation of the mass of the material for a rope of cross-section of 1 cm and 30 m length. Column (7) shows the carrying capacity of that rope before reaches the ultimate tensile strength. Column (8) presents the difference between the carrying capacity and the mass of the rope, assuming that the mass is concentrated as point mass at the end of the rope, (which is the worst case scenario). More precise calculation is not needed at the current state of analysis. Of course, significant margin is hidden under this simplification.

For the Aramid® material the margin appears negative and therefore is not suitable (would disintegrate). However, for the Zylon® a margin of 2.17 kg can be seen. That means that such a rope, as currently defined, with 1 cm2 cross-section can carry a load, in excess to its own weight (in worse case scenario as per previous note) of a material to act as cylindrical perimetric shield (or sole) of the wheel-looking spacecraft, mounted at the end of such rope (ie at the perimeter).

Accounting for 7 ropes per meter (for a 6 meter height of the cylindrical core spacecraft), for a perimeter of 188.49 m the total number of ropes are 1,319.47, their mass carrying capacity is 2,866 kg and their own mass=6,175.26 (188.49*7*4.68).

In an aspect of the invention, preferably the specific design of the tether (with respect to choice of material, dimensions, length, cross section etc) is such that the large majority of the volume of the OPLONAS is flexible enough to be folded and packed inside a launcher fairing, and not for extending into very large spanning distances. This "point design" is directed to consideration of packing it in a currently available launcher.

In an embodiment of the invention, the diameter of the tether wheel, mainly defined by the length of the individual tethers, is chosen adequately in view of the basic concept of the invention, i.e. the concept of using a tangential approach of the device for landing, thereby causing the tether wheel to rotate as a consequence of interaction with the planet/moon surface, and then to use roll friction to dissipate the kinetic energy of the landing system until it comes to a full stop. In an aspect of the invention, the length of the tethers is less than 100 m, preferably less than 60 m, even more preferably less than 30 m, resulting in an overall diameter of the tether wheel of about 60 m. Preferably, the actual size will be decided upon by the operational demand of the system in view of its applicational purpose.

As an alternative design, the case may be contemplated where instead of axial tethers, segmented beams at multiple times the height of the central cylinder, would function as rigid pillars, which can keep the cylindrical core at safe distance from the ground level. In the case where a 3 times segmented pillars of 9 meters would expand it would cover the span of 27 meters to the perimeter. The perimeter itself would be still good to be made of tether although one could consider a more rigid configuration there too (made of articulated rigid segments).

BRIEF DESCRIPTION OF THE DRAWINGS

An exemplary embodiment of the present invention is explained in greater detail with the reference to the drawings showing:

FIGS. 4a,b,c,d,e Time-line of the capture steps of MACEDONAS;
FIGS. 5a,b Time line of the capturing process of first receptacle of MACEDONAS;
FIGS. 6a,b,c Second receptacle of MACEDONAS in the form of vertical tensioned wire/rope fence segment.

In all figures, identical parts are provided with identical reference numerals.

DETAILED DESCRIPTION OF THE DRAWINGS

Figure 1:
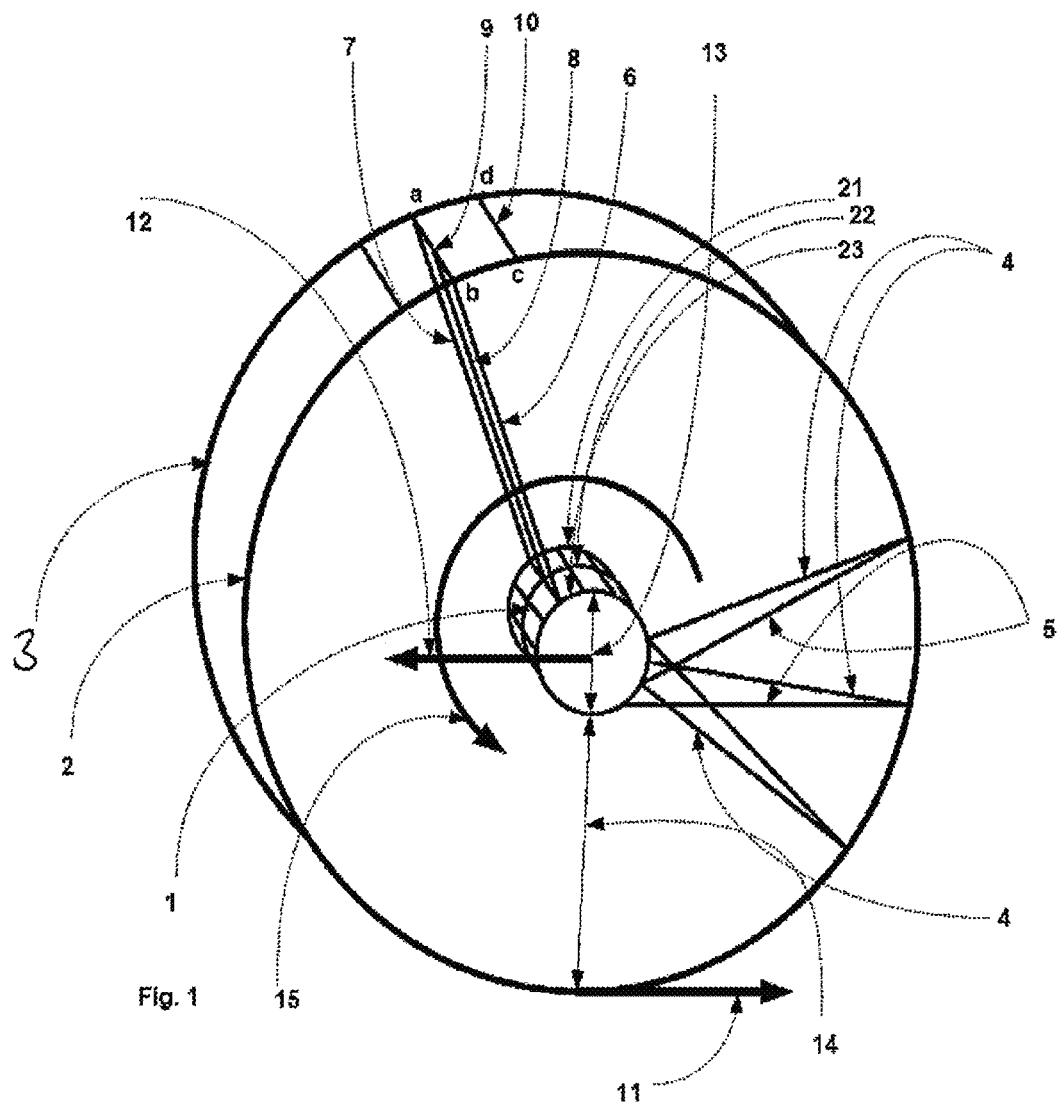
FIG. 1 A cargo spacecraft equipped with a landing system.
Figure 2:
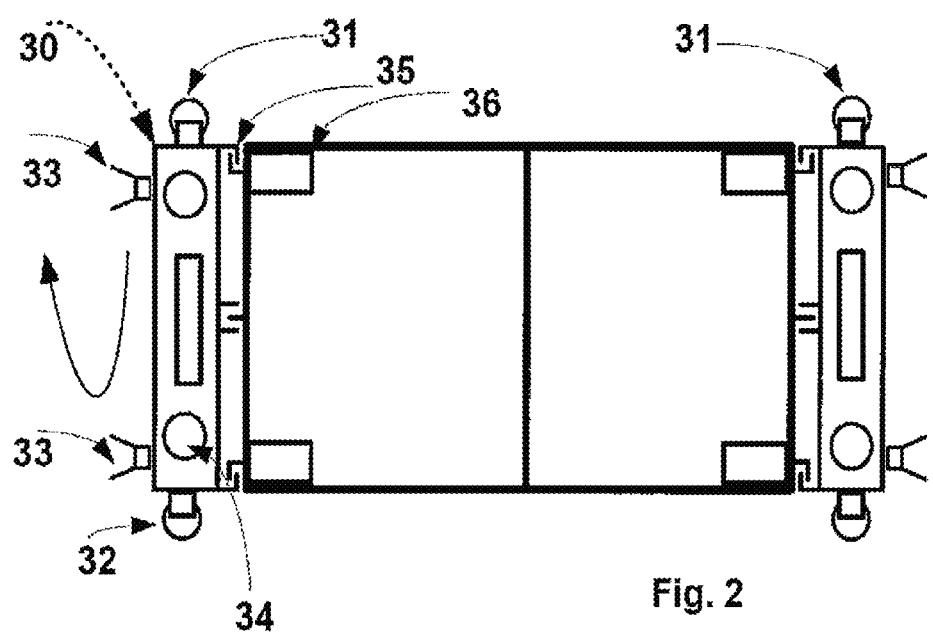
FIG. 2 the core spacecraft with additional two optional service modules.
Figure 7:
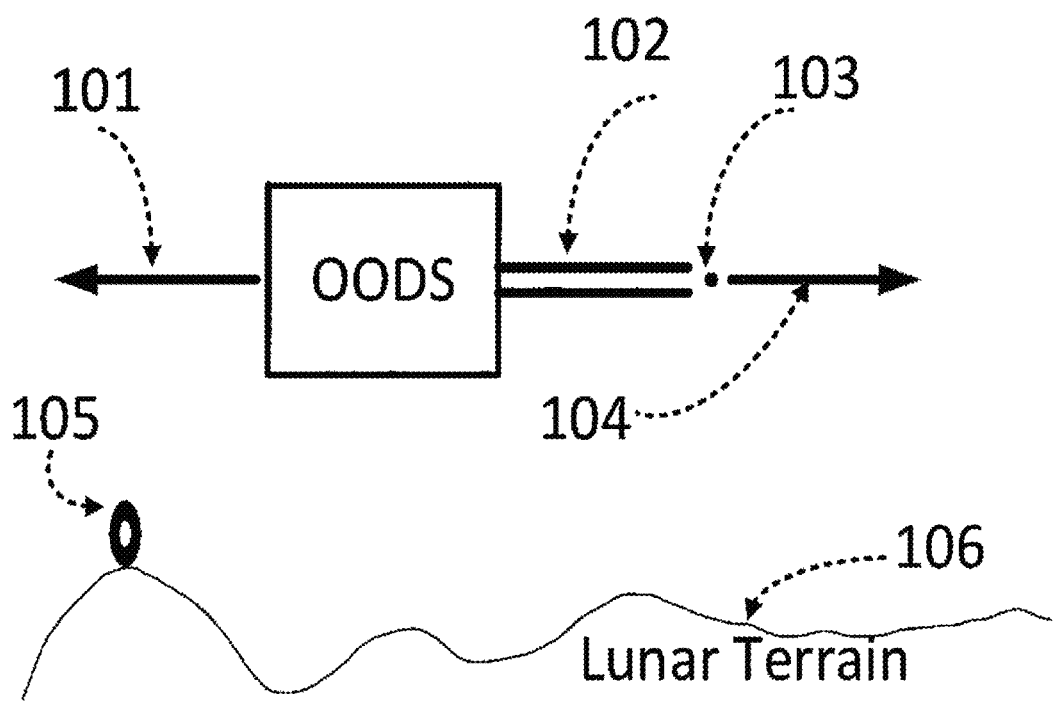
FIG. 7 schematically an over orbit delivery spacecraft.
Figure 8:
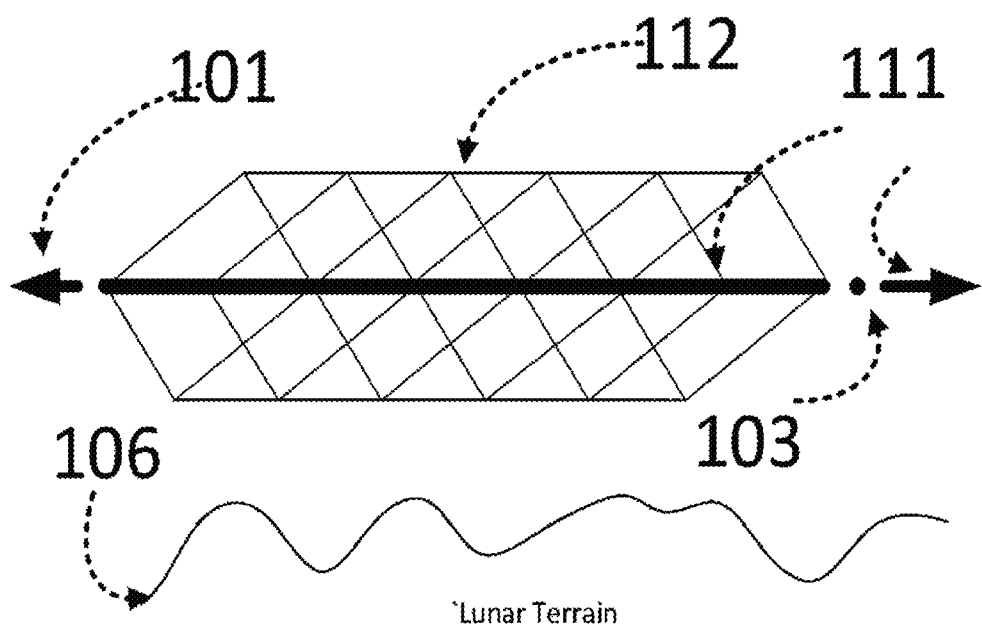
FIG. 8 an alternative embodiment of an orbit delivery spacecraft.

In principle, the FIGS. show several landing systems for the Moon and their implementation elements, which basically comprises three main groups of elements:

Wheel morphing Spacecraft for landing on the flat mare of the Moon and method for operating such spacecraft (FIGS. 1 and 2);

Wire/rope woven and tethered system for capturing high velocity parcels (FIGS. 3-6); and Orbiting delivery spacecraft (FIGS. 7 and 8).

All systems and their individual components are considered inventive per se, independently of the respective other system or components thereof.

1. A Wheel Morphing Spacecraft for Landing on the Flat Mare of the Moon and Method for Operating Such Spacecraft In FIG. 1, a wheel shaped spacecraft composed of a number of tethers is shown in the status in which, due to high speed rotation of the landing system, around the center of its mass the flexible structure of the landing system is fully deployed by rotation. Reference numeral 1 points to the cylindrical core spacecraft, consisting of a rigid payload-encapsulating structure or platform, from which emanate flexible tethers 6,7,8 ("type 1 tethers") of high tensile strength material, preferably Zylon®. On their outer rim, defining the circumference of a tether wheel spanned up, flexible tethers 2,3 ("type 2 tethers") of high tensile strength material, preferably gum-metal alloy (Ti-23Nb-0.7Ta-2Zr-1.20) are provided. The tethers 2,3,6,7,8 in their entirety shape a wheel like structure when in rotation. At launch time, the plurality of the flexible tethers (axial and perimetric) need to be wrapped and secured around the core spacecraft (in order to fit in the limited volume under fairing ("New Glenn" at 6.35 meters)) and they are deployed right before touching the lunar surface, by placing the core spacecraft in high spin rate of about 8.62 revolutions per second (for a 30 meter radius). This number of revolutions generates enormous tension on the tethers which only Zylon® so far can sustain (tensile strength 5.81150 MPa, density 5.61.56 g/cm3), or carbon fibres.

Preferably, "gum-metal" is used for the perimetric sole because it has better properties as regards abrasion, recycling and reuse. Its wires and ropes can enable the construction of the parcel landing system (MACEDONAS). Another argument for the choice of gum-metal alloy for the perimeter is the low friction coefficient. Gum metal is also suitable for momentum dumping through internal friction in multi-threaded core configurations.

The numeral 2 designates the tethers providing the circumferential outer rim of the front plane of the flexible structure and the numeral 3 designates their equivalent for the back plane. Additional planes, parallel to the front and to the back plane may be implemented as required. In the FIG. 1 numeral 9 indicates a tether that is part of a middle tether plane. Numerals 6 and 7 designate tethers belonging to the front and back plane respectively. Numerals 9 and 10 designate tethers connecting the front to the back plane, attached also to the middle plane.

Numerals 21, 22, 23 designate ring shaped stiffening structures, part of the cylindrical core payload carrying spacecraft upon which the tethers are secured.

Numerals 4 designates tethers that emanate perpendicular to the surface of the core spacecraft, while numeral 5 designates tethers emanating from adjacent securing locations laterally located at the same supportive ring. Each junction point at the perimeter of the wheel shaped structure is tensioned by a plurality of tethers. Junction points a, b, c, d, define a surface section of the perimeter which will act as the a protective "sole" segment of the wheel-looking structure.

Such an embodiment of the axial, flexible (Zylon) tethers and multifilament gum-metal threads of the protective perimetric sole, can easily be wrapped around the core payload carrying structure for volume reduction during the launch phase. Origami techniques may be further employed to accommodate semirigid configurations.

Preferred dimensions of the depicted embodiment, on which preliminary calculations have been performed, are indicated by numeral 13 (diameter of cylindrical core spacecraft=6 m), numeral 14 (length of a perimeter supporting tether=27 m). The individual support tethers will consist of multithreaded Zylon® ropes or similar material to provide the needed tensile support but be flexible enough to permit stowage for the launch in the fairing's volume.

The vector of motion with numeral 11 indicates the velocity vector of the lowest point at the perimeter of the flexible structure, the vector with numeral 12 indicates the velocity vector of the centre of mass of the spacecraft. The vector 15 indicates the direction of rotation. Vectors 11 and 12 shall be of equal size (1626 m/sec) (and of opposite direction) at the beginning of the touch down, so that the perimeter of the flexible structure "follows" the "displacement" of the lunar surface, therefore eliminating the differential speed friction. The remaining friction (roll friction) is expected to be of minor value and dependent on the smoothness/roughness of the lunar terrain as well as the depth of the pulverised naturally occurring regolith. The cylindrical surface of the wheel can be shaped as a corrugated surface with wave length tailored to the surface conditions. As a minimum it may consist of three perimetric (multifilament) ropes (1st ring, shaping a plane parallel to the forward side of the centrally located cylindrical payload carrying structure, the 2 ring shaping another plane parallel to the aft side of the centrally located cylindrical payload carrying structure and the 3 ring shaping a plane with the centrally located (in the middle of the centrally located cylindrical payload carrying structure) mounting ring.

Cross-strapping (connections between forward and aft plane) may be dictated after dynamic and braking performance analysis. The bicycle wheel type spokes constitute another potential embodiment placing however higher challenges as regards foldability. Nevertheless, a hybrid system may prove to be the optimal compromise, where spoke segments of length multiple times (1,2,3) of the centrally located cylindrical structure height (9 m) complemented by flexible rope (for the rest) can be easily stowed along the perimeter of the cylindrical core.

Lastly, another embodiment may consist of purely flexible perimetric structure (of ropes and wires) and an inflatable torus around the cylindrical core. In that case no centrally secured plane of tethers would be accommodated but only the two planes parallel to the forward and aft plane of the centrally located cylindrical structure may hold the perimetric protective sole). Such perimetric protective torus may be deployed only after rotational speed reduces to the point that centrifugal forces no longer guarantee the tension along the ropes.

In FIG. 2 the core spacecraft is illustrated with two optional service modules (30). The service modules may be needed to reduce the length of the landing field that is necessary, considering that the rims of the craters hinder the exploitation of the complete swath of the flat areas and reduction of overshooting needs propulsion capability. However, the service modules are not required in all occasions and in particular on flat mare of large size. In the cases where service modules would not be required all the functional elements of the spacecraft shall be embedded in the core spacecraft, otherwise be the payload platform only.

A semi rigid configuration of preferred embodiment is possible, where part of the tethers emanating from the rings could be replaced with rigid or compressible beams. These rigid or compressible beams could initially be folded along the side of the core spacecraft in single or multiple segments each.

In further embodiments, the basic wheel-looking spacecraft can advantageously establish the basis for more complex and efficient configurations of spacecraft. Bicycles, tricycles or 4 wheel vehicles of gargantuan dimensions, could be established. Such spacecraft may become the ideal means of landing on lunar surface, once terrain evening capabilities become possible (beyond the natural flatness). In these cases the deceleration thrusters to achieve the touch down, as well as the payload compartments will not have to be in the volume of the core spacecraft as described in FIG. 2 but other more advantageous configurations could be established.

The wheels will have to be adapted to higher load-bearing configurations. However the principle of spinning the wheels at such high speed to eliminate (or largely reduce) the differential friction upon touchdown shall be maintained.

An interesting embodiment of a two wheel landing OPLONAS could be based on a configuration similar to the wheeled Bipedal Robot ASCETO, where the payload platform is stabilized and mounted on articulated legs ending into motor activated wheels. (LQR-Assisted Whole-Body Control of a Wheeled Bipedal Robot with Kinematic Loops https://arxiv.org/pdf/2005.11431.pdf).

2. A Wire Woven and Tethered System for Capturing High Velocity Parcels (MACEDONAS)

The following figures show a tether based «parcel capturing system».

Figure 3A:
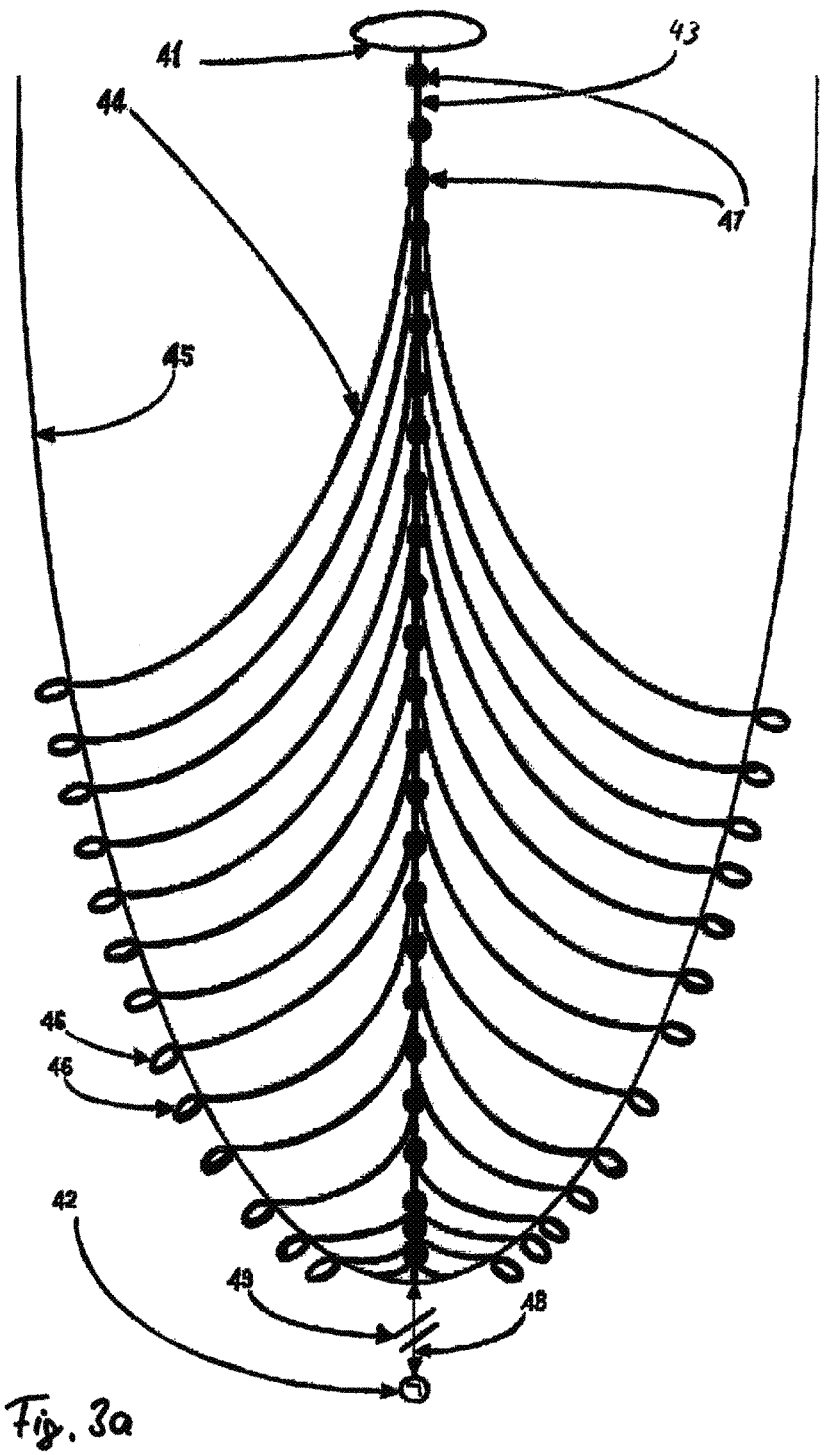
FIG. 3a Simple MACEDONAS top view (hoisted first receptacle)

FIG. 3a presents the architecture of a parcel capturing system that can be constructed principally by use of tether segments. The system described is code named "Momentum Absorption of Cargo Express Deliveries Orbiting Non-Atmospheric Somata (MACEDONAS).

Numeral 41 depicts schematically a receptacle, consisting of a vertically hoisted apparatus made of a plurality of wire woven concave surfaces, arranged one inside the other, and all secured at the exterior rim (see 70 at FIG. 3d), as successive barriers, of increasing resilience to impact of high velocity objects. In the current embodiment the assumed incoming velocity of a parcel is in the range of 1626 m/sec. The receptacle is presented in more detail in FIG. 3d, FIG. 3e. and FIG. 5a and FIG. 5b.

Numeral 42 depicts a second (final) receptacle where the cargo eventually lands to rest. It shall have the configuration of either a "safety net", similar to the ones used in circuses or in its simplest configuration to consist of just a tether tensioned at some height from the ground by vertical trusses (FIG. 6 numeral 97), and positioned precisely at a distance from the last engagement junction, equal to the length of the last branch plus an offset equal to the length of the tether that precedes the first branch of engagement (FIG. 6. numeral 94). Therefore, the length that numerals 94 and 96 of FIG. 6 indicate, have to be equal. In the case that a safety net is the configuration of choice it can ideally be placed concentrically to a crater.

Numeral 43 depicts the core tether, which connects to the initial receptacle to the dendritic arrangement of branch tethers.

Numeral 44 depicts one "branch" tether that emanates from a connection point 43 and is secured to the ground at a "securing" point 46.

Numeral 45 depicts the ideal (for a flat surface) theoretical limit of the arrangement of the branches, which have been positioned in a way (parabolic curve) not to cross each other once pulled by the central tether.

Numeral 46 depicts a securing feature on the ground where excess wire is buried under low depth soil, or winded around a conical pile of lunar soil, (screened for stones). This soil, free from stones, can provide soft breaking of the tether once it reaches full tension.

Numeral 47 depicts another attach point, where the core tether is connected to a branch tether. Multiple such connection points along the length of the central tether mechanically engage and accelerate successive branches, as the receptacle with the payload may trip from the initial location towards the final (resting) receptacle. The individual tethers are dimensioned, laid and secured in such a way to steer the payload to land at the final landing spot 42 with greater positioning accuracy with respect to the initial entry at first receptacle 41. ie apart from momentum damping they act as bias loads to steer the parcel accordingly.

The laying of wire branches is designed in such a way to provide steady and smooth increase in the drag that the receptacle experiences along the trajectory, so that the overall length of the core tether be as minimal as possible.

Figure 3B:
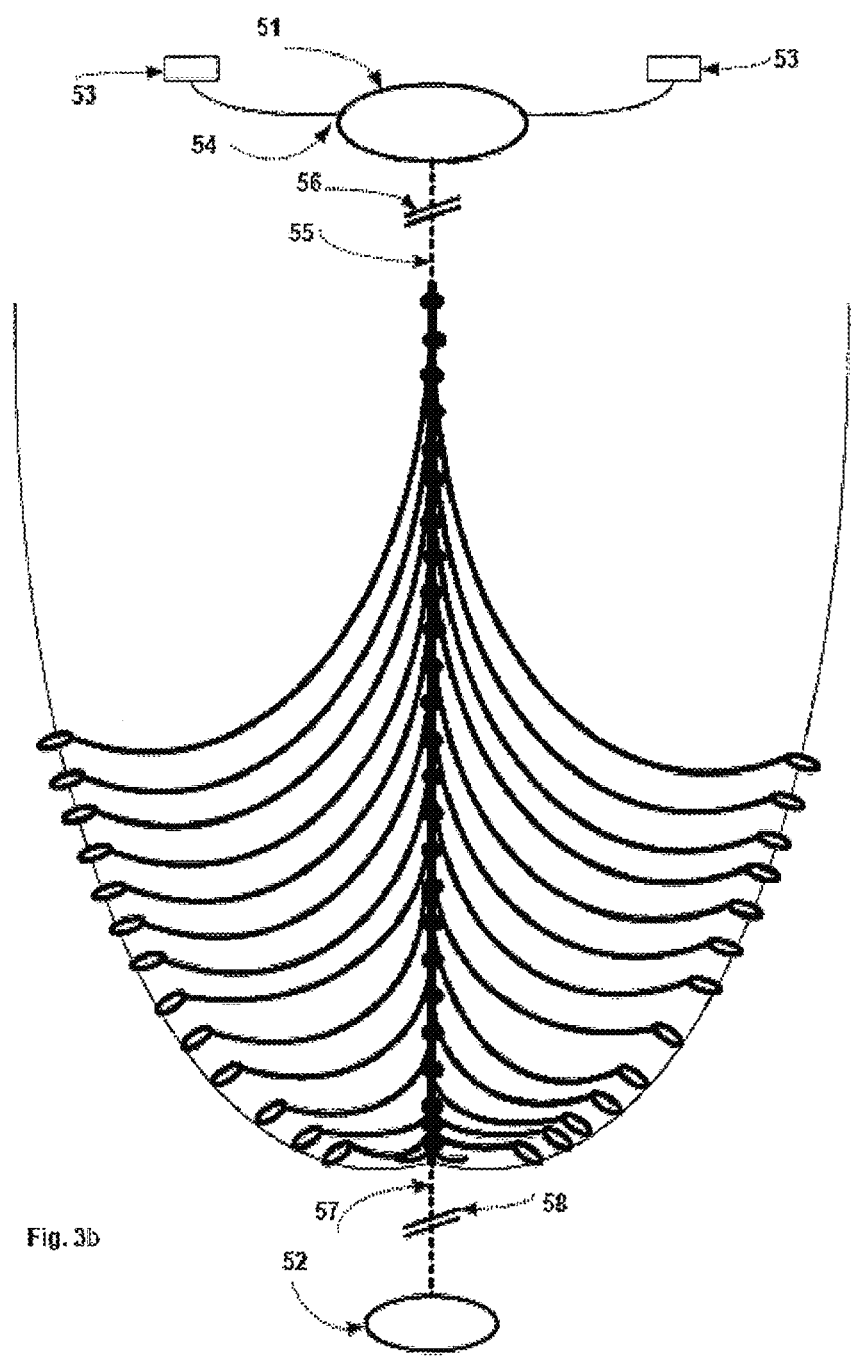
FIG. 3b MACEDONAS with lifted first receptacle top view.

FIG. 3b depicts a modified MACEDONAS in which the first receptacle (51) is not simply hoisted a few meters above ground but is suspended in high altitude by two lifting apparatuses (53).

Numeral 52 depicts schematically the final receptacle, where the first receptacle with the payload shall come to rest.

Numeral 54 depicts a connection point between the tether emanating from the lifting apparatus and the perimeter of the receptacle. That connection point is equipped with a quick disconnect (snap off) mechanism based on a brittle material.

Numeral 55 indicates the core tether. Its length typically consists of the sum of the branched segment (from first branch join to the last branch join) plus the projection of the last branch to the core tether plus the pre-branch lead and it shall be equal to the segment indicated by numeral 57.

Numeral 56 indicates that the length may vary. Similarly the numeral 58. However, as stated before, the location of the final receptacle shall be at a distance from the last engagement point equal to the sum of the branched segment plus the prebranch lead (plus the projection of the last branch to the core tether). The system therefore is adaptable to catching payloads from different altitudes with dynamic positioning of the first receptacle. The more ISRU activities take place and volatiles are collected such volatiles (of almost any kind) can be used to propel apparatuses that would lift the receptacle at significant altitudes, therefore requiring less fuel to reach the rendezvous (with the receptacle) point.

Figure 3C:
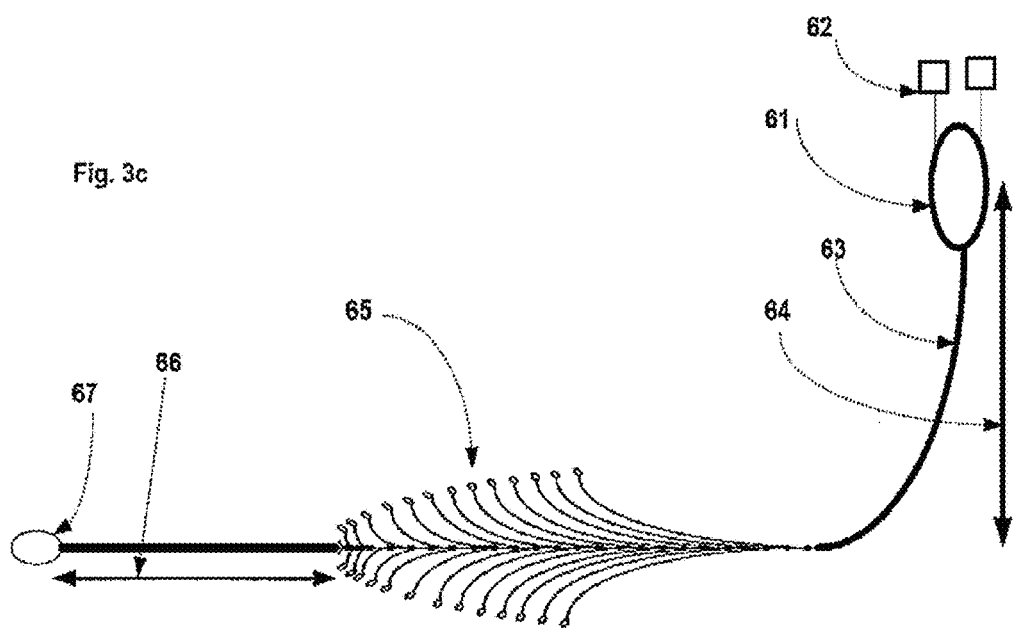
FIG. 3c MACEDONAS with lifted first receptacle, side view.

FIG. 3c depicts from lateral perspective the MACEDONAS system presented in FIG. 3b.

Figure 3D:
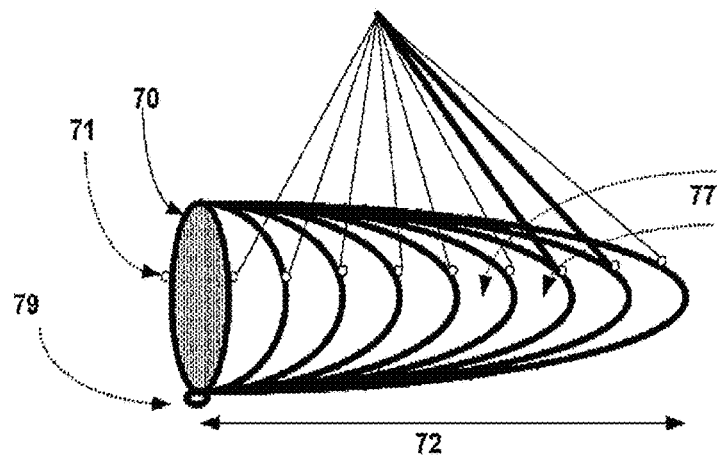
FIG. 3d first receptacle side view.
Figure 3E:
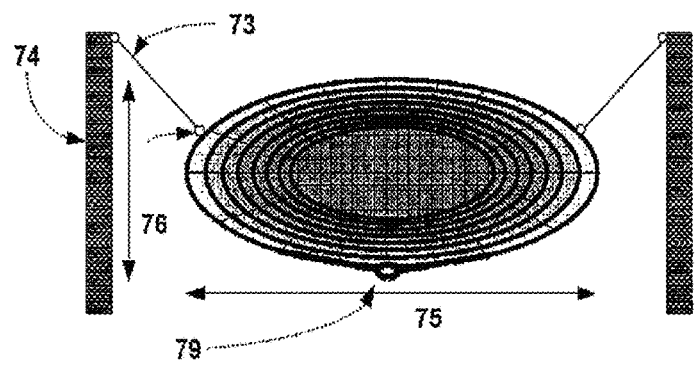

Numeral 61 depicts schematically the receptacle (for more detail see FIG. 3d and FIG. 3e as well as FIG. 5a).

Numeral 62 depicts the lifting apparatuses. Preferably operating on pressurized volatiles harvested locally (ISRU).

Numeral 63 depicts the core tether.

Numeral 64 indicates the height of which the receptacle has been lifted.

Numeral 65 depicts the dendritic part of the MACEDONAS.

Numeral 66 indicates the distance of the final receptacle from the end of the dendritic system. (Note: the end of the dendritic system is at the point where the last branch can reach, ie i.e., it is at a distance from the last connection point equal to the projection of the last branch on the core tether).

Numeral 67 indicates the final receptacle.

FIG. 3d depicts the first receptacle from side view and FIG. 3e depicts the same at a front view.

Numeral 70 indicates the rim of the first concave surface of the receptacle, on which rim are connected also the rims of the embedded concave surfaces. In this way the momentum from the parcel is transferred to the rim and through the anchor point (79) to the core tether.

Numeral 71 depicts the connection points for the lifting/hoisting of the receptacle. It is advantageously equipped with a quick disconnect (snap off) mounting (glass hook possibly or other brittle material).

Numeral 72 indicates the length of the receptacle whole.

Numeral 73 indicates a tether segment used for suspension of the receptacle.

Numeral 74 indicates a truss for securing a tether that suspends the receptacle.

Numeral 75 indicates the width of the rim.

Numeral 76 indicates the height of the rim.

Numerals 77 indicate the volumes between successive concave surfaces. It can be any of the four a) void, b) filled with compacted mixture of clay and slit, c) filled by a pre-shaped closed-cell ceramic foam, or d) antiballistic fabric, or a combination of the a,b,c,d depending on how much shock a parcel can sustain.

Numeral 79 indicates the anchor point where the core tether is secured.

FIG. 5a depicts the receptacle as it is before receiving a parcel and FIG. 5b depicts the same as after receiving a parcel, in which case all but one of the concave surfaces have been perforated and only the external restrains the parcel from escaping. In this multi concave configuration the momentum loss of the parcel (& its transfer to the anchor point (79), needed to accelerate the receptacle, is advantageously divided in 8 steps, therefore the sock impact on the parcel is also advantageously reduced significantly (other number of barriers can be devised according to specific needs). In any case it is assumed that in the beginning the commodity available for shaping the receptacle is none other than ropes from Zylon® and wires of gum-metal by which the concave surfaces are woven.

Derivative configurations may become possible at later stages, with the use of composite materials.

Numeral 50 indicates a unit of parcel. It is schematically being presented as spherical. This implies that it will constitute a passive unit of parcel to be delivered to the receptacle entrance at the right velocity and angle from an over-orbiting delivery spacecraft (OODS). That is simple to achieve even with a mechanical ejector that will eject such unit parcel at the direction opposite to the motion of the OODS, so that the unit payload loses part of its kinetic energy and altitude. The timing though of such injection is of high importance and corresponding calculations will have to be performed for each parcel drop as the orbit of the OODS will also be affected by each parcel ejection.

FIGS. 4*a* to 4*e* depict successive instances in time of the parcel momentum absorption. In particular, the time-line of the capture steps of MACEDONAS is: 4*a*: initial impact, 4*b*: initial momentum transfer from parcel to catcher, 4*c*: 6 lateral wires engaged, 4*d*: all lateral wires of dendritic system engaged, 4*e*: parcel with catcher lands on safety net (87).

In FIG. 4*a* is depicted the instance just prior to the entry of the parcel (82 (indicated with numeral 50 in FIG. 5)) at the rim of the receptacle (80).

FIG. 4*b* depicts the parcel having perforated the first 7 concave surfaces and be captured by the final (and most robust) external concave surface.

FIG. 4*c* depicts the receptacle detached & dispatched from its "anchoring" location and be propelled along a trajectory (83) indicated by the dotted "constrained ballistic trajectory". Note: it is not pure ballistic trajectory but constrained ballistic trajectory, constrained by the mechanics of the core tether and the dendritic tether system. At this moment 6 nodes of wire branches have been engaged (lifted) and add drag to the progression of the parcel carrying receptacle.

FIG. 4*d* depicts the receptacle at the moment it has progressed so much that all 13 nodes of wire branches have been engaged (lifted) (but not fully stretched the corresponding wire/rope branches).

FIG. 4*e* depicts the receptacle at the moment it has progressed so much that has engaged all joints to the wire/rope branches and has stretched them to their maximum length. By that time, (if the initial configuration of the MACEDONAS, as regards the individual elements of the system (number of branches and dimensions, terrain considerations etc)) where correct, the receptacle must have zero remaining momentum and shall land safely on the final receptacle (87 in FIG. 4*e*, or 81 in FIG. 4*a*).

The system is rather versatile as regards accepting parcels of different masses. In the schematics we use dendritic systems of 13 nodes but this can be altered at will. The length of the dendritic system, the length of the branches and their initial layout, as well as the thickness of the wire/rope tethers are all configurable parameters. Further, repeatability, with the exception of the first receptacle that will need to be replaced after each mission (and recycled), all other elements can be put back in place for the next mission in a matter of minutes, by pulling the anchor point/the core tether start back to the initial "anchor" location. The branches of the dendritic system will be laid naturally to their initial configuration (provided the soil does not hinder their motion).

FIG. 6*a* depicts from top view, a specific embodiment of final receptacle made of two trusses and horizontal wires, at the instance where the first receptacle has reached its destination. FIG. 6*b* is a side view of the receptacle hanging at the end receptacle at some distance from the ground. FIG. 6*c* front view depicting the horizontal to the ground wires/ropes, connecting the trusses, for limiting the first receptacle to loop around the top wire.

Further, the following components are shown:
height of last receptacle with respect to the local terrain (at last receptacle spot);
Start shape of first branch;
End shape of first branch;
First note of wire branch engagement;
Lead length of core tether before first node of wire branch engagement 95 distance of final receptacle from final engagement node of initial state dendritic system;
First receptacle at rest at last receptacle;
two trusses for tensioning wire tether to act as second receptacle;
top wire (bears the weight); and
other than top wires to constrain receptacle from looping around top wire.

3. An Orbital Delivery Spacecraft

FIGS. 7 and 8 each show concepts for orbital delivery spacecraft that may be used independently or in combination with elements of the systems described above. Both rely on the principle of, in tangential approach to the planet/lunar surface for delivery of a payload, accelerating the payload on board of the spacecraft in a direction tangential to the lunar/planet surface and therefore parallel to the approach direction of the spacecraft, before releasing it from the spacecraft.

In the embodiment of the over orbiting delivery spacecraft ("OODS") shown in FIG. 7;
101 is the direction of motion (tangential approach);
102 is a high-velocity, precise-targeting ejector system;
103 is a standardised parcel to be delivered;
104 is the vector of motion of the ejected standardized parcel;
105 is the receptacle of MACEDONAS;
106 is the Lunar terrain;

In this embodiment, the ejector system 102 is designed for a velocity of ejection for the parcel 103 to be half of the orbital velocity 101 of the OODS. In this way the parcel 103 will first be accelerated to approximately 931 m/sec (i.e. half of the orbital velocity) with respect to both the OODS and the lunar terrain 106. In a second phase, after release from the OODS, it will be decelerated to stand still by the same amount of velocity. Due to this concept, the protective shield of the parcel 103 will act twice and therefore is fit for double use, i.e., its sizing lower (square root of) to the case where parcel hits at full orbital velocity the MACEDONAS receptacle.

In the embodiment shown in FIG. 8, the OODS (Lunar orbiting delivery rail LODR) can be a rather elongated ejector system which may achieve orbital velocity speeds on parcels and render MACEDONAS irrelevant as parcel will free fall. Here;
111 is long parcel ejector system which can achieve ejection speeds=orbital velocity code named Lunar orbiting delivery rail LODR;
112 is a truss type structure;
111 is a velocity vector of parcel with respect to the OODS (but free falling with respect to the local).

The invention claimed is:

1. A landing system for a spacecraft comprising: a foldable tether-based carrier structure that when rotating unfolds and assumes a wheel-type shape with an outer circumference, wherein the outer circumference provides an outer structure the carrier structure rolls on after touchdown, and a center of the carrier structure supports a carrier platform for a payload of the spacecraft, in which the foldable tether-based carrier structure comprises a first set of tethers each emanating from the carrier platform and a second set of tethers which, in fully expanded state of the carrier structure, form the outer circumference of a tether wheel.

2. The landing system of claim 1, in which a length of the first set of tethers is less than 600 m.

3. The landing system of claim 1, in which the second set of tethers are made from gum-metal alloy, in particular Ti-23Nb-0.7Ta-2Zr-1.2O.

4. A parcel catching system constructed by material scavenged from the landing system of claim 1.

5. A method comprising use of components of the landing system of claim 1 to assemble a parcel catching system.

6. The landing system of claim 1, in which a length of the first set of tethers is less than 60 m.

7. The landing system of claim 1, in which a length of the first set of tethers is approximately 30 m.

\* \* \* \* \*